Feb. 1, 1944. W. C. GROENIGER 2,340,323
PLUMBING SYSTEM
Filed Nov. 27, 1940 3 Sheets-Sheet 1
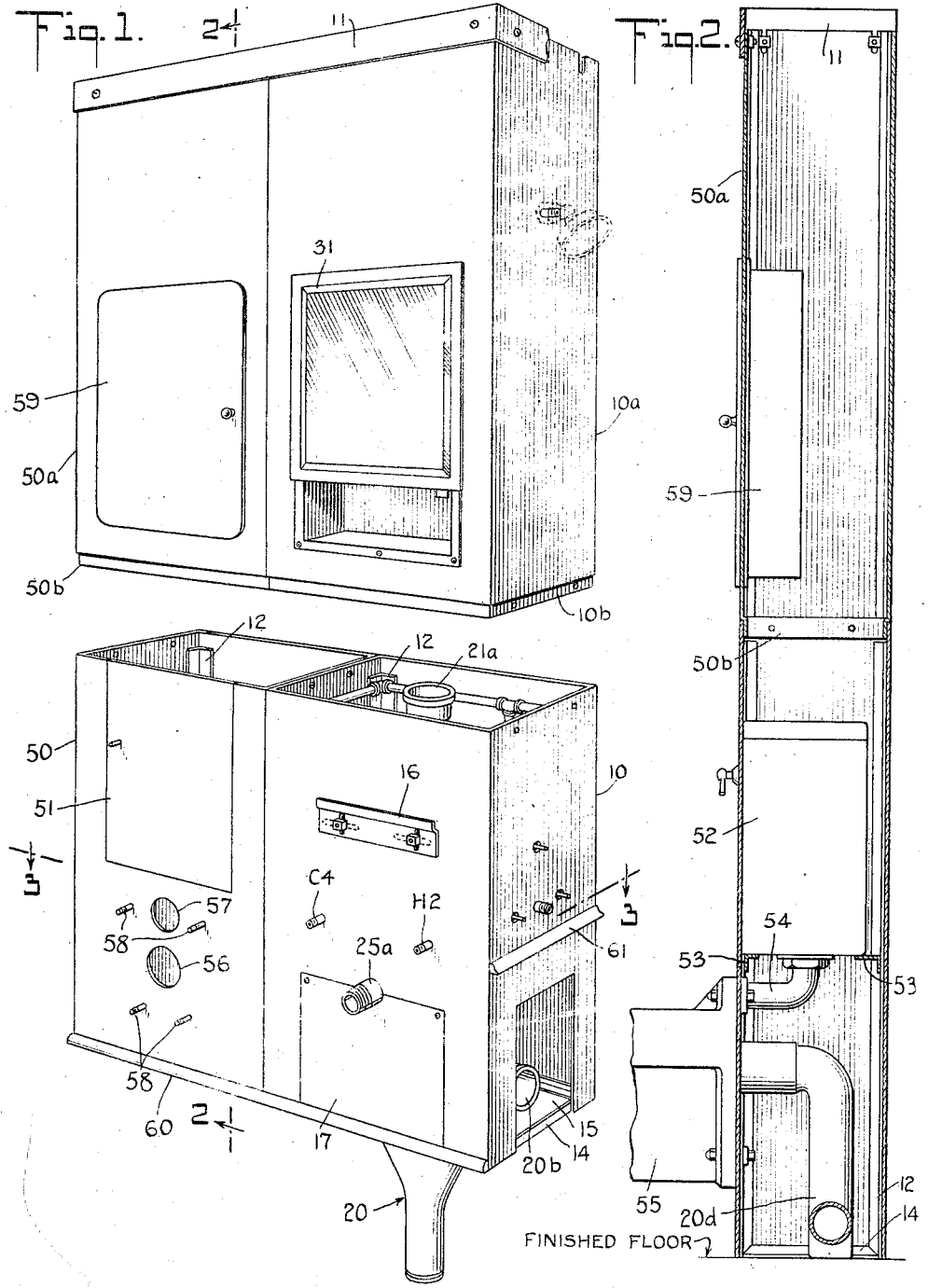
INVENTOR
William C. Groeniger
BY Henry J. Lucke
HIS ATTORNEY

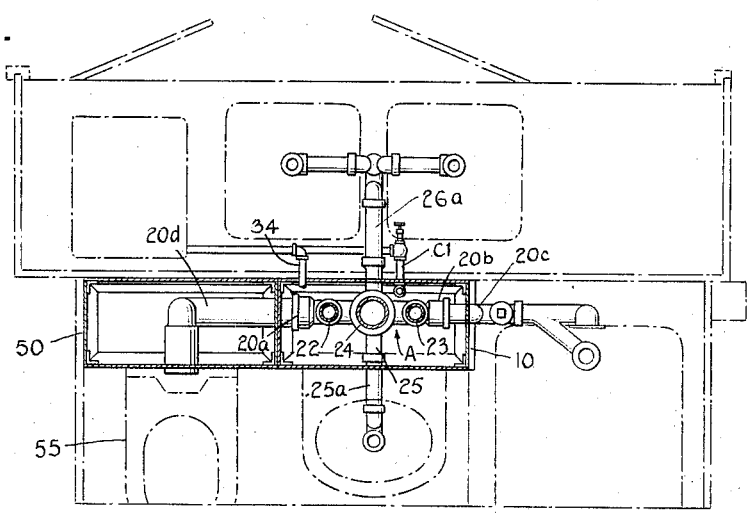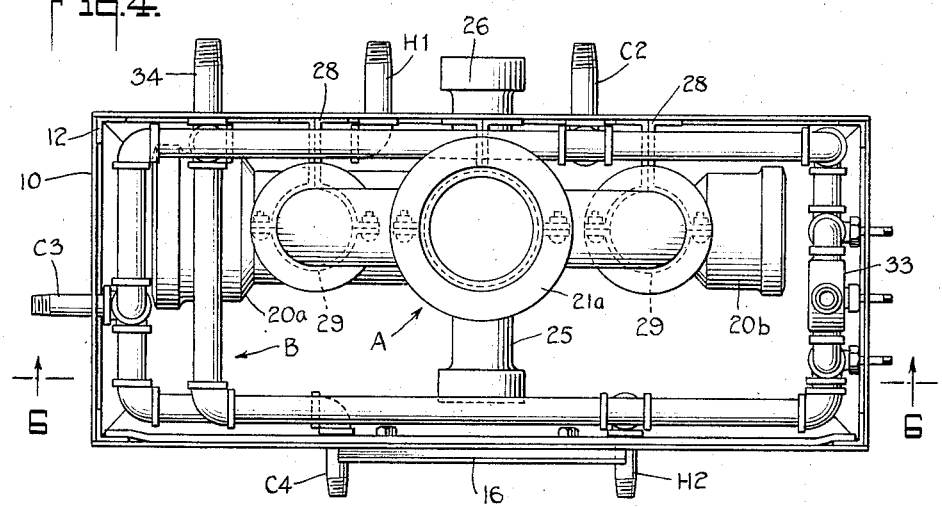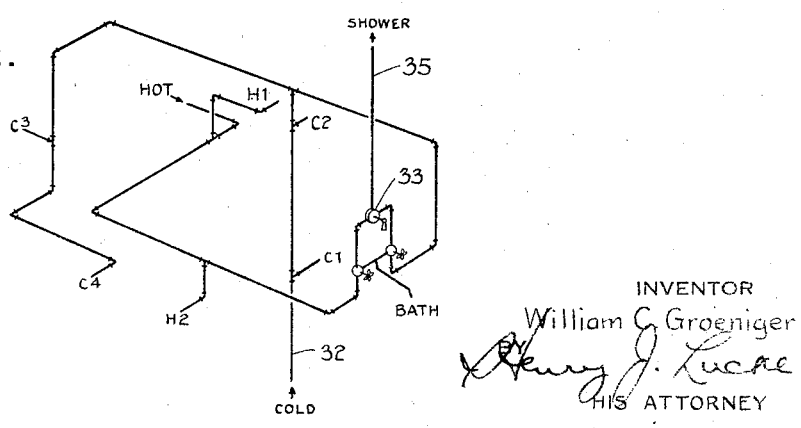

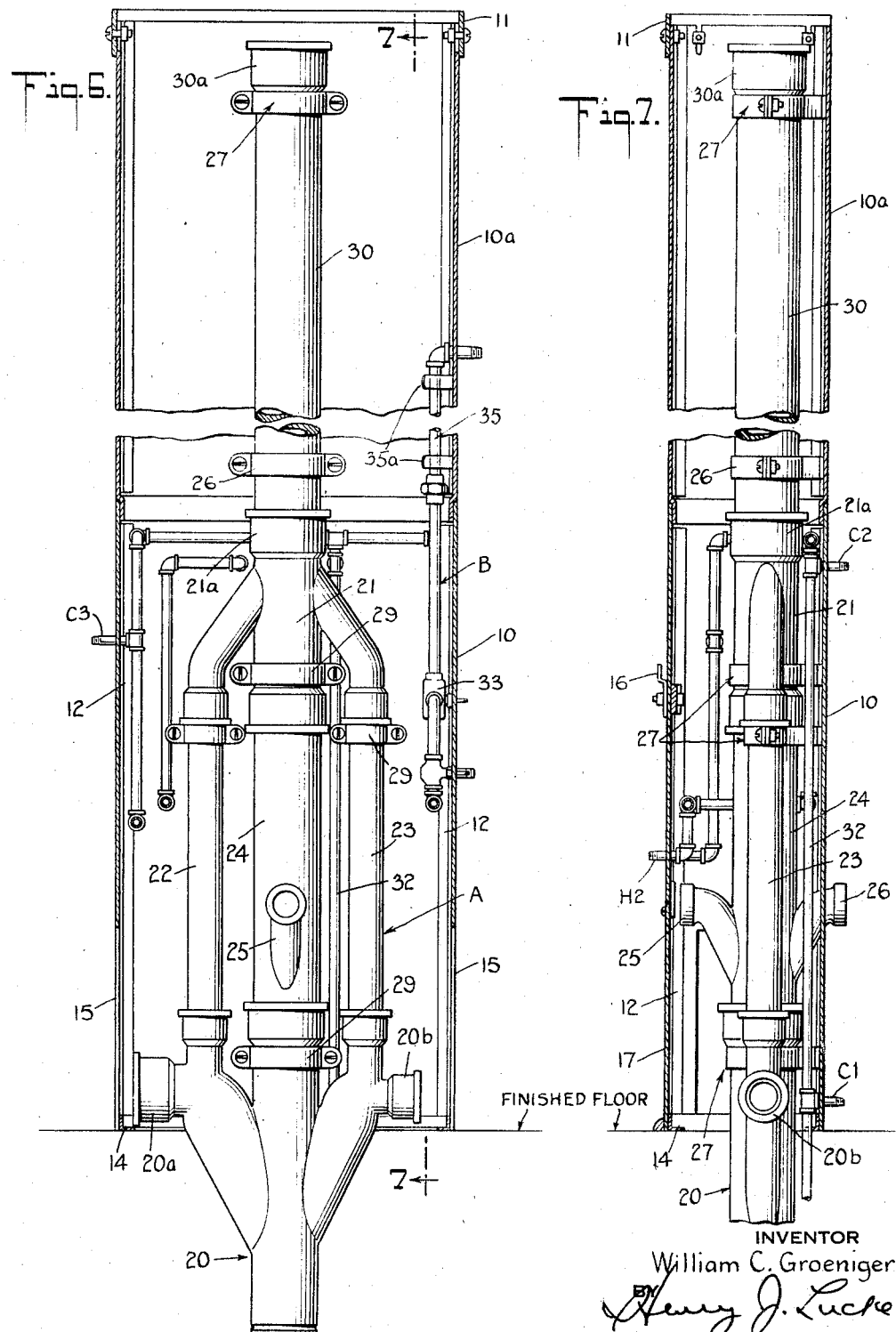

Patented Feb. 1, 1944

2,340,323

UNITED STATES PATENT OFFICE 2,340,323

PLUMBING SYSTEM

William C. Groeniger, Columbus, Ohio, assignor to John B. Pierce Foundation, New York, N. Y., a corporation of New York Application November 27, 1940, Serial No. 367,322

2 Claims. (Cl. 4—1)

This invention relates to improvements in plumbing systems.

In particular, the invention relates to improved plumbing systems, their location, construction, installation, maintenance, repair and replacement.

It is an object of this invention to provide an improved plumbing service cabinet embodying all essential soil, waste, vent and water supply piping, control valves, plumbing fixture wall supports, each in coordination with each other and each in coordination with the plumbing fixture connected thereto, serviced therefrom and supported thereby, in the smallest space possible.

It is an object of this invention to provide means for making all pipes and fittings accessible for repairing, replacement and maintenance without tearing up floors, removing ceilings or cutting into partition walls.

It is an object of this invention to provide means for placing all horizontal waste branches above the finished floor.

It is an object of this invention to provide each plumbing fixture with a separate or individual horizontal waste branch connected directly to a vertical pipe, with a short horizontal waste branch making the water travel horizontally a short distance.

It is an object of this invention to provide means of eliminating pipe thimbles, cutting of joists, piercing fire walls, dangerous steps in bathrooms, furred partitions and dropped ceilings.

It is an object of the present invention to provide means for eliminating all horizontal waste branches between floor and ceiling or in furred ceilings below the floor slab.

It is an object of the present invention to provide means for eliminating all unnecessary elbows, nipples and joints in soil, waste and vent pipes and hot and cold water pipes, thereby minimizing noise and friction, and assisting in maintaining waste pipes in an unclogged condition.

It is an object of the present invention to provide improved plumbing service cabinets in which the soil, waste, vent and water supply piping have been designed, coordinated and fitted completely in advance of installation. The joining, connecting, assembling and testing of such piping may be made on the job or at the shop under ideal conditions in the performance of work, thereby eliminating adverse and often difficult weather conditions and construction difficulties.

It is an object of the invention to provide a plumbing service unit of such character that paired units may be assembled at the place of installation by the relatively simple expedient of erecting the cabinets and setting and attaching the plumbing fixtures to any one of several arrangements of such fixtures and joining a minimum number of pipe connections.

The present invention is featured by the coordination of the plumbing service cabinets with the complement of having installed therein soil, waste, vent and water supply piping in coordinated position, whereupon they may be transported as self-contained units from the shop to the job or from the "shop on the job" to the place of installation, be it first floor, second floor or twentieth floor of a building. At the site of installation the entire plumbing unit is set in place and a small number of joints are made to connect the vertical stacks with each succeeding unit and to connect the horizontal waste branches with the plumbing fixtures.

Another feature is to fix the roughing-in measurements of supply pipes, waste openings and fixture supports of plumbing fixtures in and through the side walls of the cabinets at definite locations.

Another feature of this invention is to fix pipe centers of both main supply and drainage risers and horizontal fixture branches in order that the fixture and fixture trap connections may be direct, without unnecessary turns, elbows, offsets, and that plumbing fixtures may be set in position without installation or construction difficulties.

In the present invention it is contemplated that the plumbing service cabinet will most advantageously be constructed in units of suitable depth and width to accommodate the necessary piping therein and also to accommodate such items as medicine cabinets or the like. Preferably, the cabinets will be of substantially less than room height, to render the same easily transportable and to facilitate the installation in new buildings or replacements in old buildings. Accordingly, the ultimate installation of plumbing service cabinets pursuant to the present invention may be carried out by positioning one unit on top of another, the combined height of the units corresponding to the room height requirements of the installation.

The lowermost unit is arranged to rest upon the finished floor of the building, with soil, vent and water supply pipes extending through the floor. In the instance of a bath room or the like located on the first floor of a building, the waste and supply piping connections may be made in the basement, without the drilling of additional holes in the floor or wall to effect such connection. The uppermost service cabinet is desirably provided with an adjustable ceiling filler strip to insure a tight joint with the finished ceiling of the room, and to allow for variations in room height.

In circumstances wherein one bath room or kitchen is located one over the other as is common in multiple family installations, the soil, vent and water supply piping of the second floor bathroom or kitchen of the unit on the floor above will extend downwardly through the ceiling for joining and connecting to the soil, vent and water supply vertical pipe risers at established levels and centers accessible for joining to the soil, vent and water supply vertical pipe risers embodied in the first floor top cabinet. After joints and connections are made and tested, the ceiling filler strip is fastened in position by set screws. In addition to making the joints readily accessible the ceiling filler strip allows for variables.

Other features and advantages will hereinafter appear.

In the accompanying drawings—

Fig. 1 is an exploded perspective of a set of plumbing service cabinets embodying the present invention, illustrating the position of certain waste outlet and supply piping, fixture supports and access doors;

Fig. 2 is a section taken through 2—2 of Fig. 1, showing the defecator connection and disposition of the defecator flush tank within the cabinet, and linen cabinet;

Fig. 3 is a plan sectional view showing the arrangement of the vertical pipes and the short horizontal individual fixture branches within adjacent cabinets, and illustrating the typical arrangement of plumbing fixtures and their waste connections;

Fig. 4 is a detail plan view of a cabinet and the piping arranged therein;

Fig. 5 is a schematic perspective diagram showing the disposition of the hot and cold water supply piping within the cabinet;

Fig. 6 is an elevation, partly in section, of an assembled pair of service cabinets; and Fig. 7 is a side elevation of the cabinets of Fig. 6, taken in section on the lines 7—7 of Fig. 6.

In Figure 1, a plurality of cabinets 10, 10a and 50, 50a form a nucleus (see Fig. 3) embodying essential piping, both supply and waste, about which nucleus plumbing fixtures are arranged.

Each of the cabinets is substantially of one-half room height; as indicated in Figure 2, the upper cabinets 10a, 50a, are adapted to telescope within the ends of the respective lower cabinets; to facilitate connection, the upper cabinets are provided with interiorly offset bases 10b and 50b. Upper cabinets 10a, 50a terminate a few inches below the ceiling to facilitate the upper connection, as later described; and to complete the closure and accommodate variations in room height, cabinets 10a, 50a may have a common ceiling filler strip 11 slidably mounted at the upper portions of such cabinets and adapted to be moved upwardly against the ceiling line to effect a tight connection therewith.

The invention is featured by the pre-connection and positioning, interiorly of the cabinets, of fully connected supply and waste piping, the nipples, valve handles, etc., of which project through the cabinet walls and provide for the connection of supplementary piping and plumbing fixtures.

Pursuant to the invention, the waste and supply piping may be made up at a central plumbing shop under most desirable conditions, and there secured in position within the cabinet, for delivery to the job. At the site of installation, the respective cabinets which will form the central group of the bath room and kitchen unit may be suitably positioned and bolted together, the joints made in the vertical stacks and supply pipe, and the connections made to the plumbing fixtures.

Referring now to Figures 4 and 6, a principal cabinet 10, constructed of sheet metal, plastics or other suitable materials, is provided with an internal supporting frame structure, which may be of suitable angle irons 12, 14 or like structural elements capable of rendering substantial vertical and lateral support. As will be noted, the upper and lower ends of the cabinet are entirely open; desirably, each side wall of the cabinet may be provided with a relatively large size opening 15 to facilitate the connection of a bath tub or other plumbing fixture as later specifically set forth.

For the mounting and support of a lavatory at the front wall of the cabinet, any suitable hanger means, 16, may be provided, and to expose the internal piping for the connection of the waste outlet of the lavatory, a removable access door 17 is provided at the base of such cabinet 10.

Mounted within the cabinet, and firmly secured therein, are a soil, waste and vent pipe assembly, designated A, and a water distribution piping organization, B, as required for the service of the various plumbing fixtures. The soil, waste and vent assembly, in a typical form thereof, comprises a lower stack fitting 20, an upper stack fitting 21, stack members 22, 23, and a central stack 24 which is provided with branches 25, 26, receiving the waste matter from branch piping 25a, 26a, of the lavatory and kitchen sink, as shown in Fig. 3.

Preferably, the connections of the fittings 20, 21 and their associated stack members 22, 23, 24 are of the conventional bell and spigot type. The connections of the soil, waste and vent pipe assembly may be fully completed, whereupon it may be handled as a unit and placed within the cabinet 10.

To receive and securely position the soil, waste and vent pipe assembly, the cabinet is provided with a plurality of support means 27 for the piping 22, 23, and 24. The supports may be of any convenient form, but preferably include a base member 28 which may be welded or riveted to the rear panel of the cabinet, and a closure member 29 arranged to be bolted to said base and defining, with the upper portion of the base, a circular clamp which will fit snugly about the piping which it serves to support.

Advantage is taken of the bell ends of the piping and pipe fittings to form anchorages for the waste piping. For example, see Fig. 7, the lower support 27 is so arranged that it engages with the under side of the central bell collar of the fitting 20; each support 27 for the piping 22, 23 is likewise positioned with respect to the bell collars of the fitting 21. Upper central support 27 is disposed adjacent the central bell collar of the fitting 21. Pursuant to such organization, the assembled piping is supported against lateral or transverse movement within the cabinet.

The lower fitting 20 is disposed with its respective horizontally directed bells 20a, 20b, and forms a pipe rest and a floor support for the soil, waste and vent pipe on each floor; the main body of the fitting is arranged for projection downwardly through the floor and is thus available for connection with soil, waste and vent piping immediately below. In a one-story house, such soil piping may comprise the piping directly connecting the soil stack with the house drain which connects to the house sewer; in a multi-story house, the fitting 20 may be connected to a main soil stack, and the fitting 21 may be connected to a main vent stack; the main soil stack and the main vent stack serve duplicate units either on upper or lower floors.

It will be noted that the maximum width of the cabinet 10 is greater than the extreme width of the soil-vent piping assembly, the greatest width of such assembly being at the mouths of side branches 20a, 20b, of lower fitting 20. The depth of the cabinet is desirably greater than the mouth-to-mouth dimension from branch 25 to 26. The width and depth of the cabinets being as aforesaid, the soil piping is readily inserted into the cabinet and set into the respective supports, whereupon the cover members of such supports may be placed in position and secured.

It will be obvious that the soil, waste and vent assembly forms a "backbone" of great strength, supplemented by a pipe rest and floor support, and the angle iron supporting devices, in stiffening and strengthening the entire structure.

The access door 17 of cabinet 10, and the relatively large side openings 15, 15 thereof provide for the installation of the soil, waste and vent pipe assembly and the securement thereof within the cabinet. The complementary cabinet 10a in the plumbing system shown, includes a vent stack 30, arranged for connection with the bell of the lower fitting 21, which may be connected to a main vent stack or continued through the roof; in multistory houses, fitting 20 is connected to a main soil stack (not shown), and fitting 21 is connected to a main vent stack (not shown). The stack 30 is supported and secured on suitable hangers 27, which may be similar to those described with respect to cabinet 10.

It will be noted that the mouth 30a of stack 30 is disposed slightly beneath the upper level of cabinet 10a. Allowing for the floor thickness, the length of downward extension of a fitting 20 positions the end of said fitting in suitable connective relationship with the bell 30a of the stack 30. The connection between fitting 20 and bell 30a is, also, in the area of the adjustable ceiling filler strip 11, and when making the connection, the plumber may lower the ceiling filler strip to expose the piping to view and facilitate his operations thereon.

With respect to cabinet 10, however, it will be noted that the bell 21a of fitting 21 is disposed more nearly adjacent the uppermost surface of the cabinet. By so positioning the bell 21a, the uppermost cabinet 10a need be raised only slightly above the cabinet 10—and within the range of movement permitted by the lowering of filler strip 11—in order to set the spigot end of stack 30 into the bell 21a.

The joint between fitting 21 and vent stack 30 at bell 21a and all other joints and connections between cabinets 10 and 10a are made through the openings provided by the cut-out for the medicine cabinet 31. After the joints are made and tested, the medicine cabinet is slipped into place and held in position by bolting each side of cabinet 31 to 10a.

Following the assembly and positioning of the soil, waste and vent pipe assembly within the cabinet 10, the water service organization B may be cut to fit and placed within the cabinet. Such organization is arranged in the form of a loop which surrounds the soil, waste and vent pipe assembly without conflicting in any way with such organization or its supporting members.

In Figure 5 is shown a schematic piping diagram. According to such diagram, the cold water inlet pipe 32 extends vertically upwardly through the cabinet, and may run, see Fig. 6, along the vertical stack of the soil, waste and vent pipe assembly. Adjacent the upper edge of cabinet 10, pipe 32 branches off to both sides, following the rear and side walls of the cabinet closely. To the left of Figure 6, the cold water piping branches downwardly and terminates at the central forward panel of cabinet 10. To the right of Figure 6, the cold water line follows the side wall and connects with mixing valve 33 and conventional bath tub connections.

The hot water service piping, 34, may enter the cabinet from any location, and similarly traverse the cabinet to serve the various plumbing fixtures.

The respective nipples for connection of the cold and hot water lines to the various plumbing fixtures are designated C1, C2, H1, H2, etc.

It will be understood that in the service piping organization, all T's, elbows and the like are brought into registry with suitable openings in the service cabinet walls, whereupon the aforesaid nipples may be placed in position by passing the same through said openings and screwed into the various T and elbow openings according to the arrangement of plumbing fixtures. When the service cabinets are delivered to the site of installation, therefore, all of the internal piping is connected and positioned, and all branches, i. e., pipe extensions to traps, to which the plumbing fixtures are connected are likewise in position. When a shower is to be used, the service line 35 thereto may be secured to the side wall of cabinet 10a, as by the illustrated pipe clamps 35a; the piping may connect with the service piping in the lower cabinet as by the illustrated union connection.

Referring to Figure 3, a typical arrangement of plumbing service cabinets and plumbing fixtures is shown. Such arrangement contemplates a kitchen and a bath room in adjacency, wherein a partition of the building is common to both bath room and kitchen. In assembling the component elements of the unit, it is preferred to erect cabinets 10, 10a, and secure the same after the connections of the related piping therein have been made. With such installation procedure, the waste branch bell collar 20b is arranged for the ready connection of the bath tub outlet connection 20c, and the connection to the waste-stack organization is readily made through the aperture afforded by the removable front access door 17. Also at this time, the water closet waste line 20d may be connected to branch 20a, the opening afforded by removable access doors 17 and 51 likewise rendering it possible to make the connection without difficulty.

After waste pipe 20d has been connected, the cabinet 50 may be positioned adjacent the cabinet 10, said cabinet 50 having a side wall opening (not shown) similar to opening 15 of cabinet 10. A removable access door 51 is provided, affording access to the flush tank 52, said flush tank being mounted on angle irons 53, 53, within cabinet 50 and provided with an outlet connection 54 for connection with the water closet 55. Suitable openings 56, 57 are provided in the front panel of cabinet 50 to accommodate the flush L connection 54 and the waste pipe connection 20d. The water closet is most preferably of the wall-hung type illustrated; it is supported by floor-supported chair means within the cabinet 50, for which suitable bolts 58 and support means (not shown) are provided.

The lavatory is illustrated as positioned and supported by a suitable carrier, as 16, in the cabinet 10. The waste pipe branch 25a may be installed subsequently to the erection of the cabinet 10, and the lavatory set in position on its carrier 16 and connected to the respective water supply nipples C4, H2, and to the waste pipe branch 25a. The respective cabinets 10, 50, may be bolted together or otherwise suitably secured (not illustrated) for increased stability.

In like manner, the bath tub and sink may be connected to the respective horizontal waste branch piping means 20c, 26a, thereof, and the appropriate hot and cold water nipples connected to the faucets and valves of such bath tub and sink fixtures.

If a shower or like fixture is to be employed, the illustrated union connection between the shower feed line 35 and the supply piping organization B is completed, and the shower head attached.

Following the completion of the various final connections at the cabinet, the soil, waste and vent pipe assembly 20 may be connected to the main soil stack.

After the stages of actual connection have been completed, the medicine cabinet 31 may be set in position, and secured to the cabinet 10 by the illustrated machine screws or equivalent. Likewise, a utility or linen cabinet 59 may be set into a suitable opening in cabinet 50a, and suitably removably secured thereto. Other panels such as the access door 17 of cabinet 10 and the access door 51 of cabinet 50 may be positioned, the ceiling filler strip 11 adjusted and the illustrated items of molding 60, 61, placed in position and suitably secured.

Whereas I have described my invention by reference to specific forms thereof, it will be understood that many changes and modifications may be made without departing from the spirit of the invention.

I claim:

1. Improved plumbing means comprising, in combination, a cabinet, a pre-assembled soil, waste, and vent piping system disposed within said cabinet, said piping system being characterized by a common waste-vent stack disposed substantially centrally between the side and end walls of said cabinet and having branch members serving individual plumbing fixtures disposed symmetrically about said waste-vent stack in communication therewith, said branch members having openings facing the walls of said cabinet for individual direct connection with said waste-vent stack; means secured to a wall of said cabinet for removably securing said pipe system therein, said means including circular clamping means for embracing one or more of the pipes comprising said pipe system to rigidly support the same within said cabinet; the depth and width of said cabinet being not materially greater than the face-to-face distance between the branch-member openings facing the respective sides of the cabinet; and pre-assembled fixture-supply piping disposed within said cabinet adjacent the walls thereof to substantially encircle said soil, waste, and vent piping system, said fixture-supply piping having outlets disposed for connection with plumbing fixtures; said cabinet having outlets disposed for connection with plumbing fixtures and having openings in the walls thereof for connection of plumbing fixtures with the respective piping systems of the cabinet.

2. Improved plumbing means according to claim 1, wherein the outlet of said common waste-vent stack projects below the bottom of the cabinet for a distance greater than the total floor thickness of conventional building construction and the upper end of said waste-vent stack is disposed beneath the level of the top of the cabinet.

WILLIAM C. GROENIGER.